US012701144B2

(12) United States Patent
Poornachandran et al.

(10) Patent No.: US 12,701,144 B2
(45) Date of Patent: Aug. 4, 2026

(54) MANAGING COMPUTING SYSTEM CONFIGURATIONS FOR SECURITY QUALITY OF SERVICE (QOS)

(71) Applicant: Intel Corporation, Santa Clara, CA (US)

(72) Inventors: Rajesh Poornachandran, Portland, OR (US); Ned M. Smith, Beaverton, OR (US); Sunil K. Cheruvu, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 366 days.

(21) Appl. No.: 18/147,492

(22) Filed: Dec. 28, 2022

(65) Prior Publication Data

US 2024/0223611 A1      Jul. 4, 2024

(51) Int. Cl.
*H04L 9/40* (2022.01)
*H04L 41/0866* (2022.01)
*H04L 41/16* (2022.01)

(52) U.S. Cl.
CPC .......... *H04L 63/20* (2013.01); *H04L 41/0866* (2013.01); *H04L 41/16* (2013.01)

(58) Field of Classification Search
None
See application file for complete search history.

(56) References Cited

U.S. PATENT DOCUMENTS

| | | | |
|---|---|---|---|
| 9,088,861 B2 | 7/2015 | Prakash et al. | |
| 11,074,111 B2 * | 7/2021 | Pan | G06F 9/45533 |
| 11,109,277 B2 * | 8/2021 | Liu | H04W 28/24 |
| 11,546,420 B2 * | 1/2023 | Cady | G06N 3/044 |
| 12,052,185 B2 * | 7/2024 | Jensen | H04L 41/0894 |
| 2012/0120831 A1 * | 5/2012 | Gonsa | H04W 76/15 |
| | | | 370/252 |
| 2014/0074647 A1 * | 3/2014 | Mukherjee | G06Q 30/06 |
| | | | 705/26.7 |
| 2015/0373095 A1 * | 12/2015 | Kim | H04L 67/61 |
| | | | 709/203 |
| 2017/0230269 A1 * | 8/2017 | Kamath | H04L 41/0823 |
| 2019/0042315 A1 | 2/2019 | Smith et al. | |
| 2019/0141536 A1 | 5/2019 | Bachmutsky et al. | |
| 2021/0021619 A1 | 1/2021 | Smith et al. | |
| 2022/0078601 A1 | 3/2022 | Poornachandran et al. | |
| 2023/0098961 A1 * | 3/2023 | Jensen | H04L 41/22 |
| | | | 370/254 |
| 2024/0223611 A1 * | 7/2024 | Poornachandran | H04L 63/20 |

FOREIGN PATENT DOCUMENTS

| | | |
|---|---|---|
| EP | 3629212 B1 | 10/2021 |
| WO | 2020/226979 A2 | 11/2020 |

* cited by examiner

*Primary Examiner* — Backhean Tiv

(74) *Attorney, Agent, or Firm* — Nicholson De Vos Webster & Elliott LLP

(57) ABSTRACT

The technology described herein includes determining a security quality of service (Qos) profile matching configuration attributes of a first computing system, generating an interdependency flow graph based at least in part on the security QoS profile and the configuration attributes, generating a recommended configuration for the first computing system from the interdependency flow graph, and sending the recommended configuration to a second computing system.

20 Claims, 10 Drawing Sheets

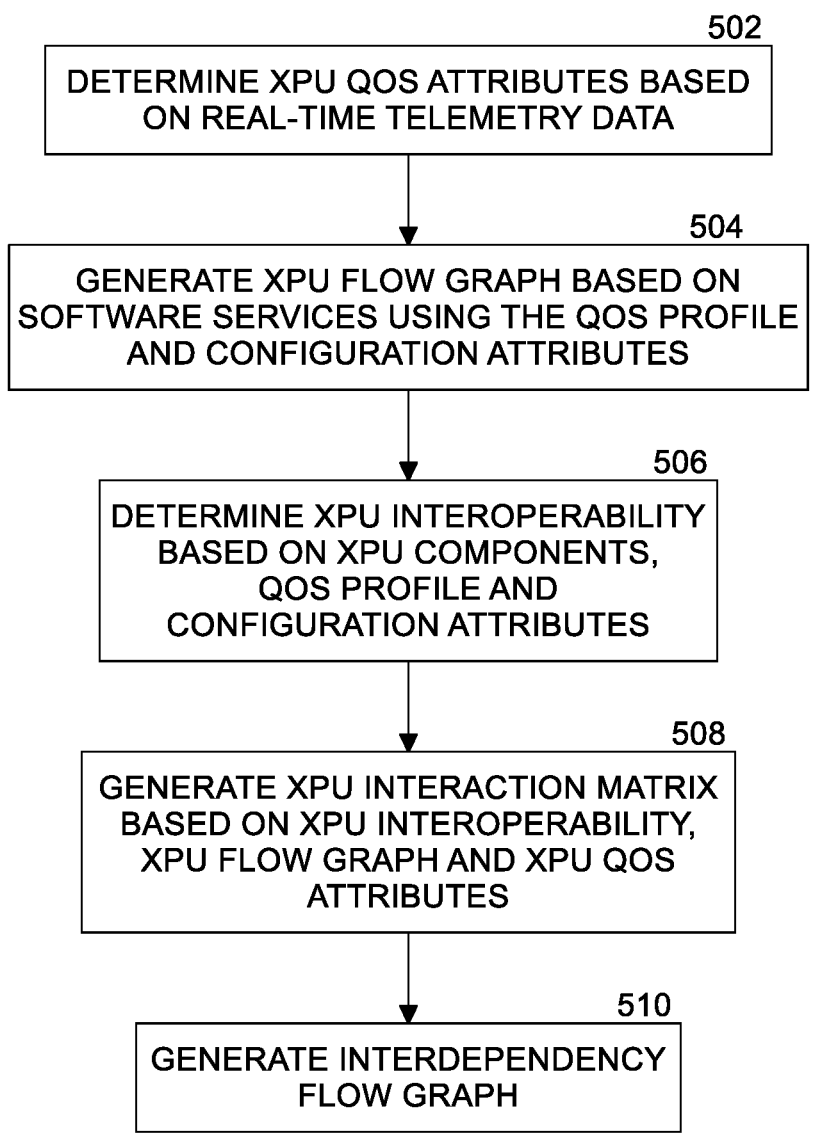

502

DETERMINE XPU QOS ATTRIBUTES BASED
ON REAL-TIME TELEMETRY DATA

504

GENERATE XPU FLOW GRAPH BASED ON
SOFTWARE SERVICES USING THE QOS PROFILE
AND CONFIGURATION ATTRIBUTES

506

DETERMINE XPU INTEROPERABILITY
BASED ON XPU COMPONENTS,
QOS PROFILE AND
CONFIGURATION ATTRIBUTES

508

GENERATE XPU INTERACTION MATRIX
BASED ON XPU INTEROPERABILITY,
XPU FLOW GRAPH AND XPU QOS
ATTRIBUTES

510

GENERATE INTERDEPENDENCY
FLOW GRAPH

MANAGING COMPUTING SYSTEM CONFIGURATIONS FOR SECURITY QUALITY OF SERVICE (QOS)

FIELD OF THE DISCLOSURE

This disclosure relates generally to security in computing systems, and more particularly, to maintaining and guaranteeing security QoS for workloads running on computing systems.

BACKGROUND

In current computing system environments, use cases including microservices, Function as a Service (FaaS) capabilities, etc., often involve dynamic allocations of multiple software (SW) and hardware (HW) components. For example, workloads may be performed on any combination of client devices, Internet of Things (IOT) devices, edge devices, and cloud computing servers, and workloads may be moved between computing systems. Current computing system environments are typically focused on overall performance (e.g., as measured by latency) assuming a single security Service Level Agreement (SLA). There is no capability for a security Quality of Service (QoS) to be specified by entities such as users, software and/or system developers that depend on the capabilities provided by Intellectual Property (IP) block providers, System on a Chip (SoC) integrators, and/or independent SW vendors (ISVs) providing SW services to support security QoS attributes for futureproofing end to end elastic workloads. Existing approaches lack functions for managing fine granular security QoS across the complete end to end SW and HW stack in a computing system environment.

BRIEF DESCRIPTION OF THE DRAWINGS

FIG. 5 illustrates interdependency flow graph generator processing according to an example.

The figures are not to scale. In general, the same reference numbers will be used throughout the drawing(s) and accompanying written description to refer to the same or like parts.

DETAILED DESCRIPTION

Figure 1:
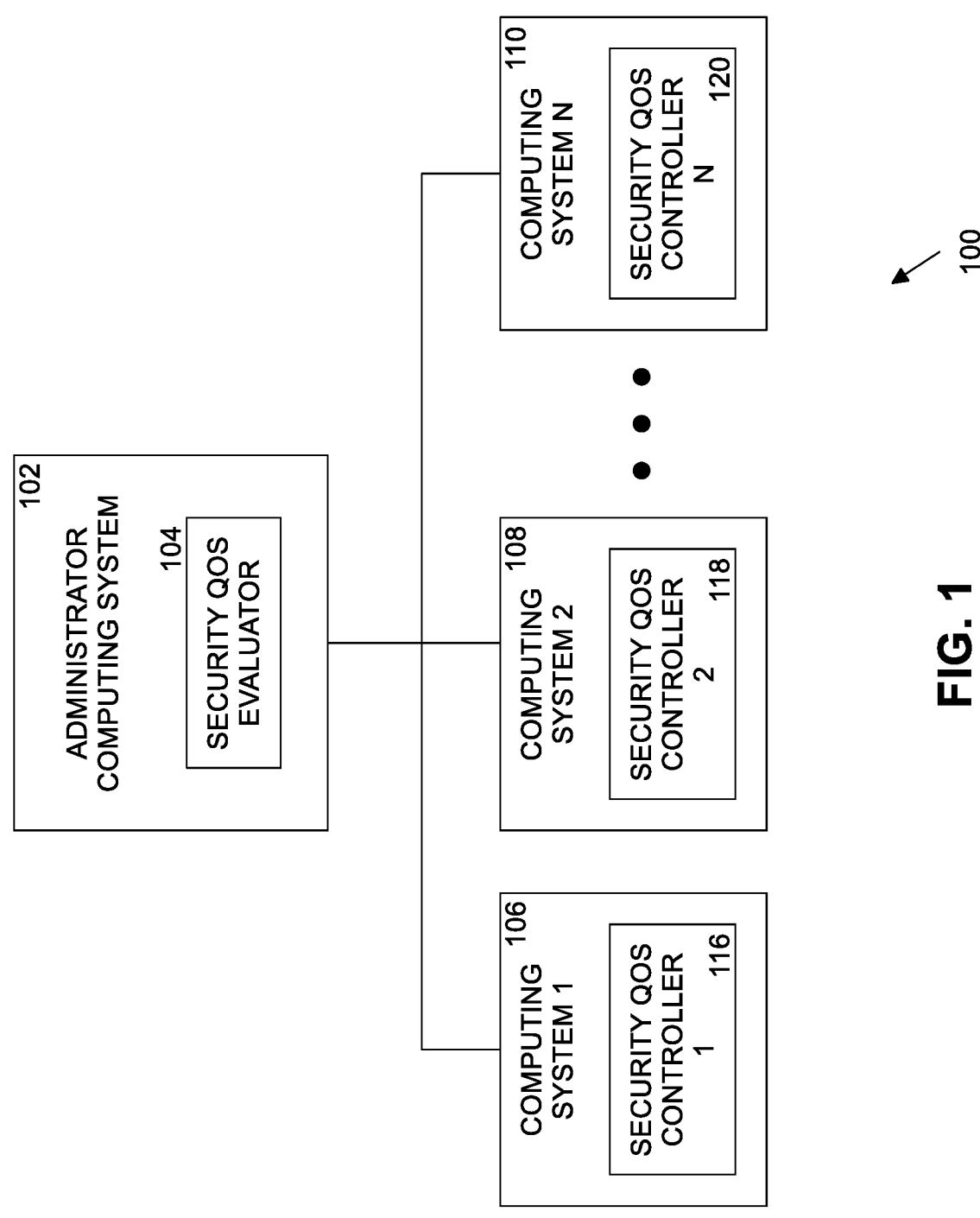
FIG. 1 illustrates a computing system environment according to an example.

The technology described herein provides for a computing system to configure a security SLA computing system environment with an optimal power and performance profile while also meeting specific security QoS requirements. In an implementation, the computing system generates and updates an interdependency flow graph representing the security QoS requirements and components of the computing system environment available to be configured to perform workloads. The interdependency flow graph is analyzed to generate a recommended configuration for the computing system environment such that the security QoS requirements are satisfied. The interdependency flow graph may be dynamically updated based at least in part on "hot plugging" and/or "hot unplugging" of components.

As used herein components of computing systems of the computing system environment include central processing units (CPUs), graphics processing units (GPUs), field programmable gate arrays (FPGAs), application specific integrated circuits (ASICs), digital signal processors (DSPs), IP blocks, communications circuitry, computational storage devices, storage and memory devices (including solid state drives (SSDs), dual inline memory modules (DIMMs), etc., HW accelerators (including inference accelerators), XPUs, performance monitoring units (PMUs), or other computing devices supporting performance of workloads (e.g., artificial intelligence (AI) recommendation systems (that provide content provider content recommendations), database management systems, media transcoding (to perform live or offline video content encode/decode/transcode operations), etc.), as well as SW services.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized and that logical, mechanical, electrical and/or other changes may be made without departing from the scope of the subject matter of this disclosure. The following detailed description is, therefore, provided to describe example implementations and not to be taken as limiting on the scope of the subject matter described in this disclosure. Certain features from different aspects of the following description may be combined to form yet new aspects of the subject matter discussed below.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real-world imperfections.

As used herein, "processor circuitry" or "hardware resources" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

As used herein, a computing system can be, for example, a server, a disaggregated server, a personal computer, a workstation, a self-learning machine (e.g., a neural network), a mobile device (e.g., a cell phone, a smart phone, a tablet (such as an iPad™)), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device. A computing system may include one or more dynamic random-access memories (DRAMs) to store data. A computing system may include one or more multi-chip packages (MCPs), with each MCP including one or more IP blocks. A computing system environment includes one or more computing systems, with each computing system including a plurality of computing system components.

FIG. 1 illustrates a computing system environment 100 according to an example. An administrator computing system 102 performs administrative and management functions for the computing system environment. In an implementation, administrator computing system 102 may be a server running in a cloud computing data center operated by a cloud service provider (CSP). Administrator computing system 102 includes security QoS evaluator 104 to evaluate configuration recommendations received from other computing systems in the computing system environment and to configure or re-configure those computing systems to support security QoS requirements. Although only one administrator computing system 102 and one security QoS evaluator 104 is shown in the example of FIG. 1, in various implementations there may be many administrator computing systems in the computing system environment, possibly spread over many data centers located at the same site or at different sites, and any administrator computing system may include a plurality of security QoS evaluators.

Computing system environment 100 includes a plurality of computing systems, represented in FIG. 1 as computing system 1 106, computing system 2 108, . . . computing system N 110, where N is a natural number. In an implementation, there may be tens, hundreds, thousands, or even tens of thousands of computing systems under management by administrator computing system 102. Each computing system includes a plurality of computing system components that may need to be configured and/or managed to support security QoS requirements. As shown in FIG. 1, computing system 1 106 includes security QoS controller 116, computing system 2 108 includes security QoS controller 2 118, . . . computing system N 110 includes security QoS controller N 120. Each security QoS controller analyzes one or more QoS profiles and one or more configuration attributes of a computing system and generates a recommended configuration whereby application of a selection of configuration attributes results in one or more of the security QoS requirements of the one or more QoS profiles being met. In an example, security QoS controllers may be implemented as one of firmware, hardware, or software in computing systems. In an example, a security QoS controller may be implemented as firmware in a computing system component, such as a CPU, GPU, XPU, etc. In an example, a security QoS controller may be implemented as part of a virtual machine manager (VMM) (also known as a hypervisor).

Figure 2:
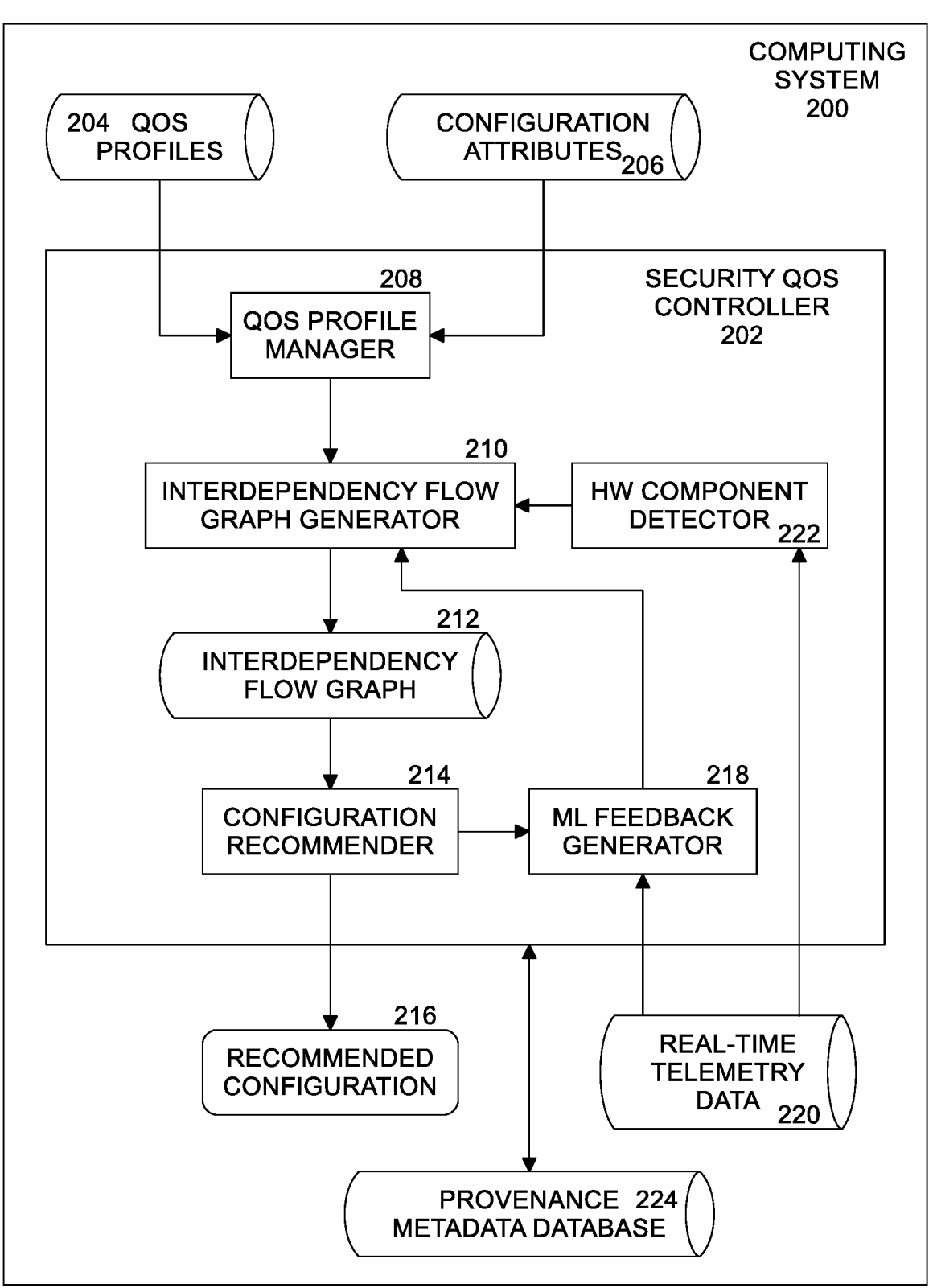
FIG. 2 illustrates a computing system including a security QoS controller according to an example.

FIG. 2 illustrates a computing system 200 including a security QoS controller 202 according to an example. Security QoS controller 202 is an instance of one or more of security QoS controller 1 116, security QoS controller 2 118, . . . security QoS controller N 120 of FIG. 1. Security QoS controller 202 includes QoS profile manager 208 to receive and manage a plurality of QoS profiles 204.

A QoS profile 204 comprises a set of QoS requirements to provide a particular security QoS for a computing system 200. For example, a QoS profile 204 may include information such as specification of a processor version and accompanying security characteristics (e.g., an Intel Xeon processor with Software Guard Extensions (SGX) and hyperthreading and a certain number of processing cores), memory bandwidth, system power requirements and usage, thermal requirements, etc.

Table 1 shows an example of a QoS profile 204. This example QoS profile 204 describes a full stack encryption method, encryption algorithm, and XPU parameters in terms of minimum frequency (Fmin), desired frequency (Fdesired), minimum memory bandwidth (MemBWmin), desired memory bandwidth (MemBWdesired), minimum cache size (CacheSizemin), desired cache size (CacheSizedesired), minimum Instructions Per Clock (IPC) cycle (IPCmin), etc. In other examples, other parameters may be specified.

TABLE 1

```
Struct QoS_Profile {
    Encryption Method {Symmetric, Asymmetric},
    Encryption Algorithm {RSA, ECC, 3DES, AES},
    Fmin,
    Fdesired,
    MemBWmin,
    MemBWdesired,
    CacheSizemin,
    CacheSizedesired,
    Xeon-generational IPCmin,
    MigrationTolerance,
    Xeon IPC requirement,
    Accelerator Config,
    ReservedFields
} ;
```

A user or administrator of the computing system 200 hosting the security QoS controller may provide the QoS profile 204. In an implementation, a QoS profile 204 may be provided via a basic input/output system (BIOS) or a model specific register (MSR) and a mailbox mechanism across a system supply chain state (e.g., manufacturing, provisioning, integration, and validation). QoS profile manager 208 uses the QoS profile 204 and configuration attributes 206 to generate a specific QoS profile mapping to a selected set of computing system components under consideration. Configuration attributes 206 may include information describing the computing system components available to be configured in a computing system. For example, configuration attributes 206 may include the number, type, and attributes of hardware components (potentially including CPUs, GPUs, XPUs, FPGAs, ASICs, memory devices, communications devices, etc.) and software components (potentially including applications, runtime libraries, operating systems (OSs), virtual machine managers (VMMs)/hypervisors, etc.) that may be installed in the computing system.

In an implementation, QoS Profile Manager 208 uses one or more QoS Profiles 204 along with configuration attributes 206 to identify one or more potential existing profiles in configuration attributes 206 that, when implemented, can meet SLA requirements of an application to be run on computing system 200, using one or more of the available configuration attributes. This identification of the best QoS profile is policy configurable in terms of the right matchmaking or trade-off to be accomplished if there is not an exact match of a QoS profile 204 to current requirements. For example, a particular QoS profile might prefer GPU-based acceleration for AI inference but is flexible for other XPU choices. In an example, it may be determined by QoS profile manager 208 from configuration attributes 206 that a GPU isn't available in computing system 200 but if the request can be served via a CPU or ASIC, given the QoS profile's tolerance to an alternative XPU, a CPU might be selected by security QoS controller 202.

Hardware (HW) component detector 222 generates computing system configuration snapshots at stages of a computing system lifecycle. That is, the configuration may change in response to a hardware component being added to the computing system or removed from the computing system during runtime. Any hot plugging in or unplugging of computing system components (e.g., CPUs, GPUs, XPUs, FPGAs, ASICs, memory devices, communications devices, etc.) may be detected and information regarding these events forwarded to interdependency flow graph generator 210. Additionally, HW component detector 222 determines snapshots at selected times of computing system manufacturing and deployment, including manufacturing by an original device manufacturer (ODM), provisioning by an original equipment manufacturer (OEM), deployment at an edge computing device or a cloud server, etc. In an implementation, HW component detector 222 receives real-time telemetry data 220 from computing system components of computing system 200.

In an implementation, real-time telemetry data 220 may include data such as performance monitoring data from dynamic hardware resources that are available in the computing system at any given instant based on enumeration of components of the computing system managed by system firmware (such as unified extensible firmware interface (UEFI) basic input/output system (BIOS)) and performance monitoring counters available at the various XPUs, interconnect components and storage components to retrieve metrics needed to manage/maintain the QoS attributes (potentially including operating frequency, supported encryption methods/algorithms, memory performance/dual inline memory modules (DIMM) errors, peripheral component interconnect express (PCIe)/compute express link (CXL) performance/link errors, etc.).

Interdependency flow graph generator 210 generates interdependency flow graph 212 based at least in part on QoS profiles 204 and configuration attributes 206 processed by QoS profile manager 208, HW components of computing system 200 detected by HW component detector 222, and real-time telemetry data 220 as processed by machine learning (ML) feedback generator 218 and HW component detector 222. Interdependency flow graph 212 comprises a data structure representation of QoS requirements and computing system configuration information.

In an implementation, interdependency flow graph 212 may be a function of one or more of an interaction matrix, XPU QoS attributes, application (App) service level objectives (SLO), and ML feedback (based on analysis of past configuration decisions).

Interdependency flow graph =

$FUNC$ (interaction matrix, $XPU$ $QoS$ attributes, $App$ $SLOs$, $ML$ feedback)

An interaction matrix may be defined as a function of a XPU roster, XPU shared services, XPU interoperability, a XPU flow graph, and a XPU power weightage matrix.

Interaction matrix = $FUNC$ ($XPU$ roster, $XPU$ shared services, $XPU$ interoperability, $XPU$ flow graph, $XPU$ power weightage matrix)

In an implementation, a XPU roster is a list of the discovered XPUs available in each computing system(s) under consideration. Examples include CPU, GPU, FPGA, SmartNIC, etc. XPU shared services includes the shared computing system components across the XPUs. Examples include double data rate (DDR) memory, computer express link (CXL)/peripheral component interconnect express (PCIe) interconnect, storage devices, SmartNIC, etc. XPU interoperability includes the determined interoperability between the XPUs based on workload characteristics. One example includes using a SmartNIC, GPU and CPU for an artificial intelligence (AI) inference use case. A XPU flow graph is a data flow graph describing data flows between the identified XPUs (using XPU interoperability data and XPU shared services), interconnect and storage. One example includes data flows from SmartNIC to DDR memory that are then processed by a CPU and shared with a GPU for inferencing, then the GPU inferred data is sent to the CPU to be forwarded to the NIC in an AI inference use case. A XPU power weightage matrix includes the power weightage or power cap to be applied for specific XPUs based on application utilization metrics. For example, a XPU power weightage matrix might include a rule of setting a 50% utilization instead of 100% utilization.

In an implementation, a XPU flow graph is defined as a function of a services roster, a services compute flow, services data flow, and emulation capabilities and limitations.

$$XPU \text{ flow graph} = FUNC \text{ (services roster, services compute flow,}$$

$$\text{services data flow, and emulation capabilities and limitations)}$$

A services roster includes discovered software (SW) services available on a computing system 200 under consideration. Examples include microservices, remote procedure calls (gRPCs), etc. A services compute flow includes a compute call sequence flow graph between identified SW services. Examples include datatype format (32-bit floating point (FP32)) and a precision used for AI inference (8-bit integer (INT8)). Emulation capabilities and limitations include any XPU limitation in terms of HW acceleration or emulation of future capabilities (e.g., FP4 precision used for AI inference operations).

XPU QoS attributes may be defined as a function of XPU compute, XPU latency, and XPU throughput.

$$XPU \text{ } QoS \text{ attributes} =$$

$$FUNC\_TELEMETRY \text{ (}XPU \text{ compute, }XPU \text{ latency, }XPU \text{ throughput)}$$

FUNC_TELEMETRY includes data from performance monitoring unit (PMU) counters across discovered XPUs in the XPU roster in terms of compute utilization (e.g., 20%, 50%, etc.), latency (e.g., in milliseconds), and throughput in terms of an amount of data processed (e.g., sentences per second in an AI inference use case).

App SLOs may be defined as a function of XPU options, latency/jitter QoS requirements, and power/total cost of ownership (TCO) requirements.

$$APP \text{ } SLO = FUNC \text{ (}XPU \text{ options, latency/jitter requirements,}$$

$$power/TCO \text{ requirements)}$$

XPU options include a choice of XPU and XPU attributes to be used (e.g., GPU with FP16 support). Latency/jitter requirements include an application latency requirement from the computing system (e.g., respond to a query in an AI inference use case within 5 milliseconds).

ML feedback may be defined as a function of a reinforcement learning (RL) interaction matrix, policy management rules, and updated weights.

$$ML \text{ feedback} =$$

$$FUNC \text{ (}RL \text{ interaction matrix, policy management rules, updated weights)}$$

RL interaction matrix includes RL reward-based parameters for a ML process to add weights to a recommended configuration. Policy management rules include overrides for ML input data. Updated weights include deep learning weights to be updated for any fine-tuning of a ML model based on real world scenarios and/or learning.

In other implementations, other data and combinations of data may be used in generating the interdependency flow graph 212.

Configuration recommender 214 generates a recommended configuration 216 for the computing system 200 based at least in part on the interdependency flow graph 212. The recommended configuration 216 is sent to security QoS evaluator 104.

In an implementation, security QoS controller 202 also stores one or more of QoS profiles 204, configuration attributes 206, interdependency flow graph 212, real-time telemetry data 220 and recommended configuration 216 as provenance metadata in a secure data base to provide a secure audit trail for configurations of the computing system 200. In an implementation, the secure data base comprises a public ledger such as a blockchain which may be used to track peer-to-peer configuration recommendations.

In an implementation, provenance metadata may include secure metadata to track which IP blocks and services operate on what tasks in a configuration, especially when heterogeneous multiple services work in conjunction with different/competing vendors. Traceability of onboarding and offboarding microservices and revocation management across XPUs may be achieved in a privacy preserving manner, for example by using homomorphic encryption (HE).

In an implementation, provenance metadata may be defined as shown in Table 2.

TABLE 2

| Provenance_MetaData { |
| On-boarded MicroServices_Ingredients, |
| Off-boarded MicroServices Ingredients, |
| Side_car_Utilization, |
| XPU_Compute_Utilization, |
| XPU_Compute_Charactersitcs, |
| Revoked MicroServices Ingredients}; |

Figure 3:
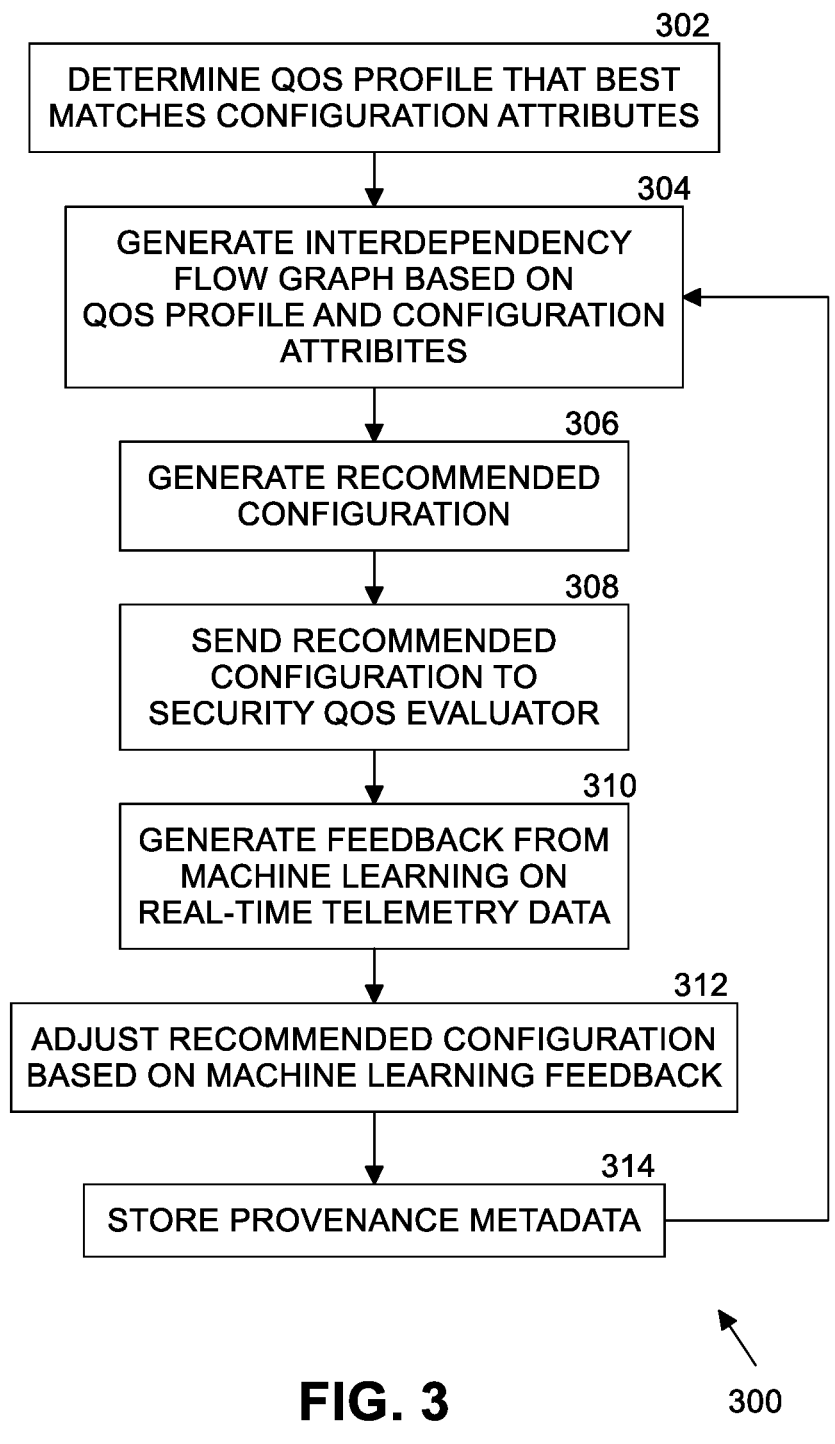
FIG. 3 illustrates security QoS controller processing according to an example.

FIG. 3 illustrates security QoS controller processing 300 according to an example. At block 302, QoS profile manager 208 determines a QoS profile 204 that best matches the configuration attributes 206. At block 304 interdependency flow graph generator 210 generates interdependency flow graph 212 based at least in part on the matching QoS profile 204 and configuration attributes 206. At block 306, configuration recommender 214 generates recommended configuration 216 based at least in part on interdependency flow graph 212. At block 308, security QoS controller 202 sends the recommended configuration 216 to security QoS evaluator 104. At block 310, ML feedback generator 218 generates feedback from machine learning operations on real-time telemetry data 220 and recommended configuration 216. Feedback may be sent to interdependency flow graph generator 210, which may then adjust the recommended configuration 216 at block 312 based at least in part on the machine learning feedback. At block 314, security QoS controller 202 stores provenance metadata. Processing continues with block 304 to regenerate the interdependency flow graph 212. Blocks 304-314 may be repeated as necessary over time.

In an implementation, provenance metadata may be sent to security QoS evaluator 104. In an implementation, security QoS evaluator 104 logs the provenance metadata in a blockchain. In another implementation, security QoS controllers log the provenance metadata in a blockchain.

Figure 4:
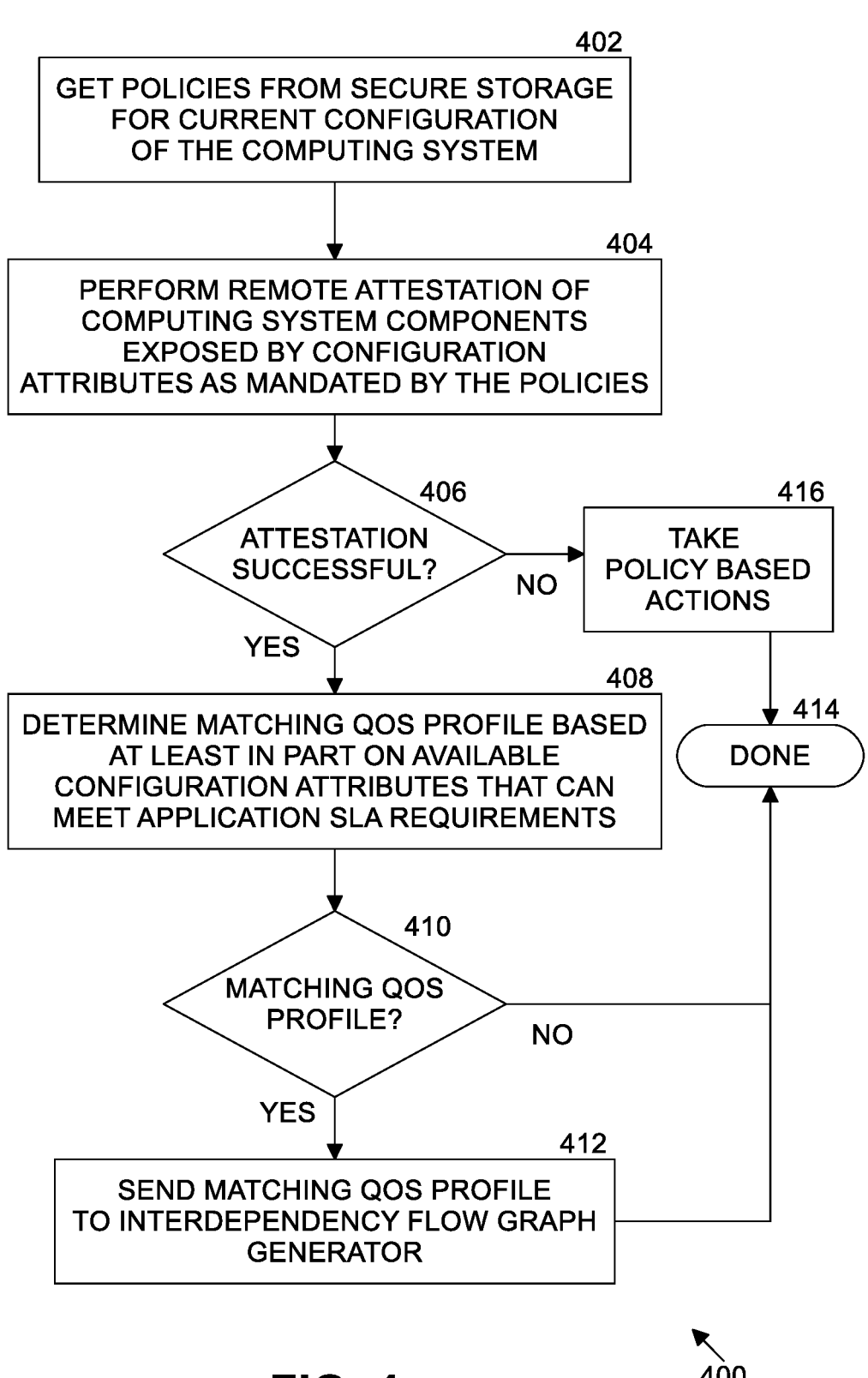
FIG. 4 illustrates QoS manager processing according to an example.

FIG. 4 illustrates QoS manager processing 400 according to an example. At block 402, QoS profile manager 208 gets one or more policies from a secure storage applicable for a current configuration of the computing system 200. In an implementation, a policy includes one or more actions to take when errors occur during QoS profile manager processing. At block 404, QoS profile manager 208 performs remote attestation of computing system components exposed by configuration attributes 206 as mandated by the one or more policies. If the attestation is not successful at block 406, then policy-based actions may be taken by QoS profile manager 208 at block 416. For example, a policy-based action may be to notify security QoS evaluator 104, to use a default or previously successfully attested QoS profile 204, log information about the security QoS configuration attempt, abort security QoS processing and notify the administrator computing system 102, etc. QoS profile manager processing is then complete at block 414.

If the attestation is successful at block 406, then at block 408 QoS profile manager 208 determines if there is a matching QoS profile based at least in part on the available configuration attributes 206 that can best meet application (e.g., workload) service level agreement (SLA) requirements of an application to be run on the computing system. An SLA is typically negotiated as part of the contract between a cloud provider and a user (e.g., of a computing system) when subscribing to a CSP service. SLAs often include QoS requirements. As used herein, a best matching QoS profile is a QoS profile that is closest overall to meeting the SLA requirements. If a matching QoS profile is determined at block 408, then at block 412 QoS profile manager 208 sends the matching QoS profile to interdependency flow graph generator 210. If a matching QoS profile is not determined at block 408, the processing is complete at block 414.

An SLA is sometimes mapped into a machine-readable format called Service Level Objectives (SLO). The portion of the SLO that deals with QoS includes QoS requirements. The QoS profile is a portion or fragment of a workload that identifies resource requirements for enforcing the QoS requirements (such as a bandwidth reservation resource). Performance telemetry resulting from application of the SLO is called Service Level Indicators (SLI). The data in real-time telemetry data 220 may be used to produce the SLI.

FIG. 5 illustrates interdependency flow graph generator processing 500 according to an example. At block 502, interdependency flow graph generator 210 determines XPU QoS attributes based at least in part on real-time telemetry data 220 (e.g., as analyzed and reported by HW component detector 222). At block 504, interdependency flow graph generator 210 generates a XPU flow graph based at least in part on registered software services based on data and compute flows using the matching QoS profile, and configuration attributes 206. At block 506, interdependency flow graph generator 210 determines XPU interoperability based at least in part on data and compute flow across XPU components in configuration attributes 206 for the matching QoS profile. At block 508, interdependency flow graph generator 210 generates a XPU interaction matrix based at least in part on the XPU interoperability, XPU flow graph, and XPU QoS attributes. At block 510, interdependency flow graph generator 210 generates interdependency flow graph 212 based at least in part on the XPU interaction matrix. XPU QoS attributes, application SLA requirements, and ML feedback from ML feedback generator 218.

Figure 6:
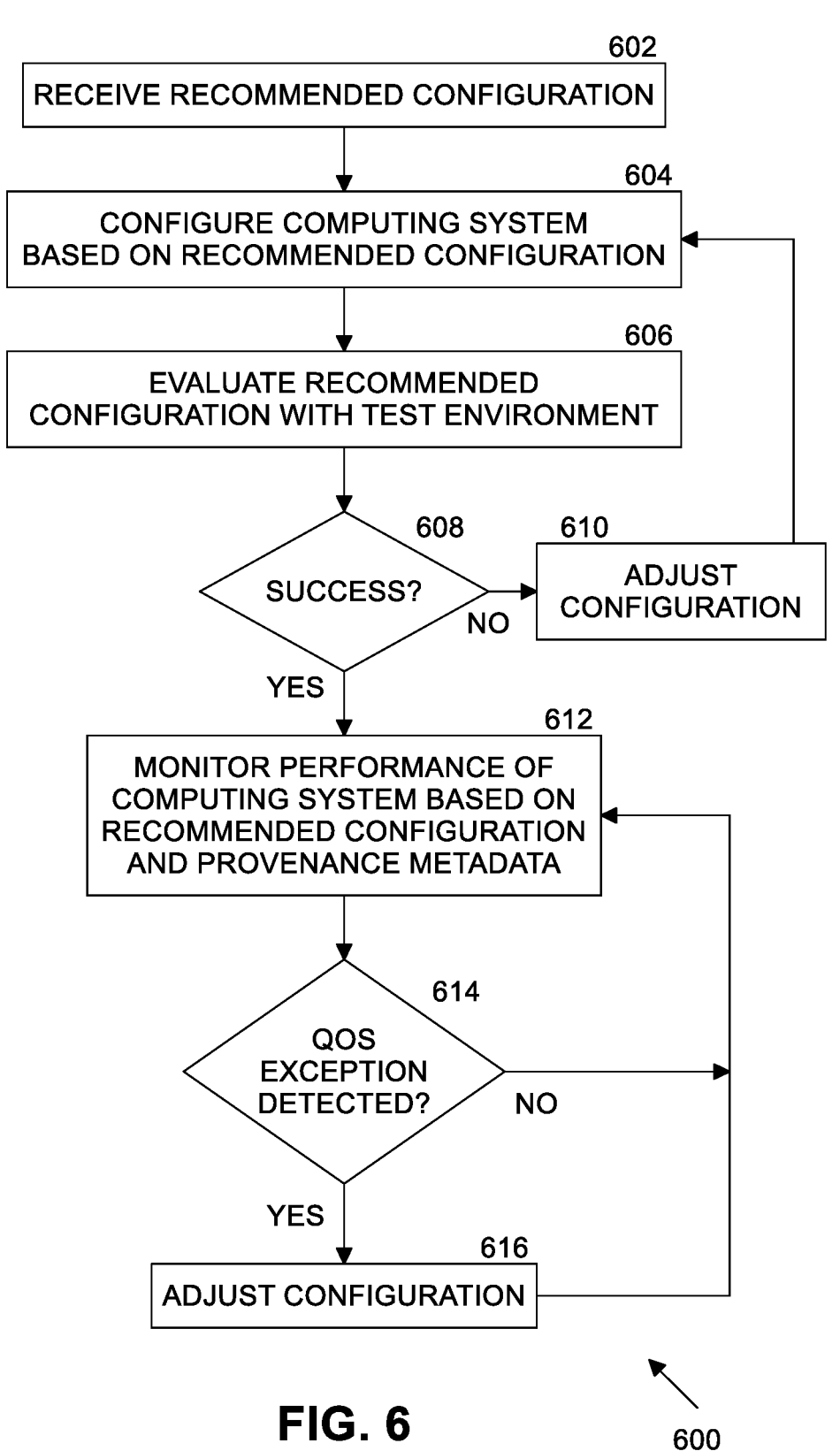
FIG. 6 illustrates security QoS evaluator processing according to an example.

FIG. 6 illustrates security QoS evaluator processing 600 according to an example. At block 602, security QoS evaluator 104 receives a recommended configuration 216 from a computing system (e.g., one of computing system 1 106, computing system 2 108, . . . computing system N 110). At block 604, security QoS evaluator 104 configures the computing system based at least in part on the recommended configuration 216. At block 606, security QoS evaluator 104 evaluates the recommended configuration using a test environment for the computing system. At block 608, if the test is not a success, then at block 610 security QoS evaluator 104 adjusts the configuration and reconfigures the computing system at block 604. If the test is a success, then at block 612, security QoS evaluator 104 monitors performance of the computing system based at least in part on the recommended configuration 216 and provenance metadata. During the monitoring (over time), if a QoS exception for the computing system is detected at either the computing system or the administrator computing system 102, at block 616 the configuration may be adjusted (e.g., the computing system is reconfigured in response to the QoS exception to bring the computing system back in compliance with QoS requirements). Processing continues with block 612 after the adjustment or directly to block 612 of no QoS exception is detected. In an implementation, when a configuration is adjected, processing may continue with evaluating the adjusted configuration with a test environment at block 606.

While an example manner of implementing the technology described herein is illustrated in FIGS. 1-6, one or more of the elements, processes, and/or devices illustrated in FIGS. 1-6 may be combined, divided, re-arranged, omitted, eliminated, and/or implemented in any other way. Further, the example computing system may be implemented by hardware, software, firmware, and/or any combination of hardware, software, and/or firmware. Thus, for example, any of computing systems 102, 106, 108 . . . 110 could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device (s) (FPLD(s)) such as Field Programmable Gate Arrays (FPGAs). When reading any of the apparatus or system claims of this patent to cover a purely software and/or firmware implementation, at least one of the example hardware resources is/are hereby expressly defined to include a non-transitory computer readable storage device or storage disk such as a memory, a digital versatile disk (DVD), a compact disk (CD), a Blu-ray disk, etc., including the software and/or firmware. Further still, the example circuitry of FIGS. 1-6 may include one or more elements, processes, and/or devices in addition to, or instead of, those illustrated in FIGS. 1-6, and/or may include more than one of any or all the illustrated elements, processes and devices.

Diagrams representative of example hardware logic circuitry, machine readable instructions, hardware implemented state machines, and/or any combination thereof is shown in FIGS. 1-6. The machine readable instructions may be one or more executable programs or portion(s) of an executable program for execution by processor circuitry, such as the processor circuitry 1112 shown in the example processor platform 1100 discussed below in connection with FIG. 7 and/or the example processor circuitry discussed below in connection with FIGS. 8 and/or 9. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The tangible machine-readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices.

Further, although the example program is described with reference to the diagrams illustrated in FIGS. 1-6, many other methods of implementing the example computing system may alternatively be used. For example, the order of execution of the blocks may be changed, and/or some of the blocks described may be changed, eliminated, or combined. Additionally or alternatively, any or all of the blocks shown in FIGS. 1-6 may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine-readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine-readable instructions may be fragmented and stored on one or more storage devices and/or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine-readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine-readable instructions may be stored in a state in which they may be read by processor circuitry, but require addition of a library (e.g., a dynamic link library (DLL)), a software development kit (SDK), an application programming interface (API), etc., in order to execute the machine-readable instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, machine readable media, as used herein, may include machine readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 1-6 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C. (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 7:
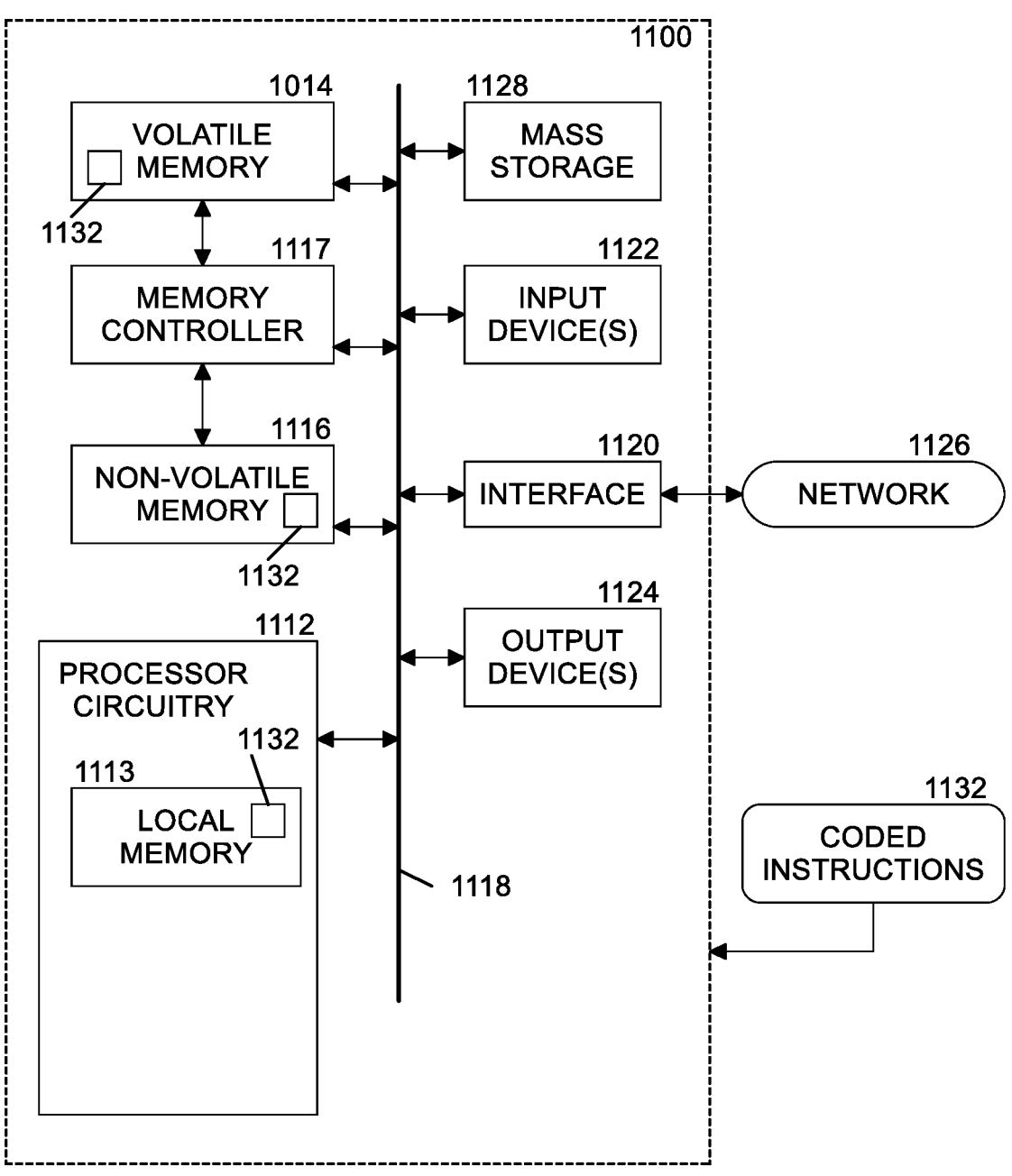
FIG. 7 is a block diagram of an example processor platform structured to execute and/or instantiate the machine-readable instructions and/or operations of FIGS. 1-6 to implement the apparatus discussed with reference to FIGS. 1-6.

FIG. 7 is a block diagram of an example processor platform 1100 structured to execute and/or instantiate the machine-readable instructions and/or operations of FIGS. 1-6. The processor platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1100 of the illustrated example includes processor circuitry 1112. The processor circuitry 1112 of the illustrated example is hardware. For example, the processor circuitry 1112 can be implemented by one or more integrated circuits, logic circuits, FPGAs microprocessors, CPUs, GPUs, DSPs, and/or microcontrollers from any desired family or manufacturer. The processor circuitry 1112 may be implemented by one or more semiconductor based (e.g., silicon based) devices.

The processor circuitry 1112 of the illustrated example includes a local memory 1113 (e.g., a cache, registers, etc.). The processor circuitry 1112 of the illustrated example is in communication with a main memory including a volatile memory 1114 and a non-volatile memory 1116 by a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1116 may be implemented by flash memory and/or any other desired type of memory device. Access to the main memory 1114, 1116 of the illustrated example is controlled by a memory controller 1117.

The processor platform 1100 of the illustrated example also includes interface circuitry 1120. The interface circuitry 1120 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1122 are connected to the interface circuitry 1120. The input device(s) 1122 permit(s) a user to enter data and/or commands into the processor circuitry 1112. The input device(s) 1122 can be implemented by, for example, an audio sensor, a microphone, a camera (still or video), a keyboard, a button, a mouse, a touchscreen, a trackpad, a trackball, an isopoint device, and/or a voice recognition system.

One or more output devices 1124 are also connected to the interface circuitry 1120 of the illustrated example. The output devices 1124 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1120 of the illustrated example, thus, typically includes a graphics driver card, a graphics driver chip, and/or graphics processor circuitry such as a GPU.

The interface circuitry 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1126. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1100 of the illustrated example also includes one or more mass storage devices 1128 to store software and/or data. Examples of such mass storage devices 1128 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1132, which may be implemented by the machine-readable instructions of FIGS. 1-6, may be stored in the mass storage device 1128, in the volatile memory 1114, in the non-volatile memory 1116, and/or on a removable non-transitory computer readable storage medium such as a CD or DVD.

Figure 8:
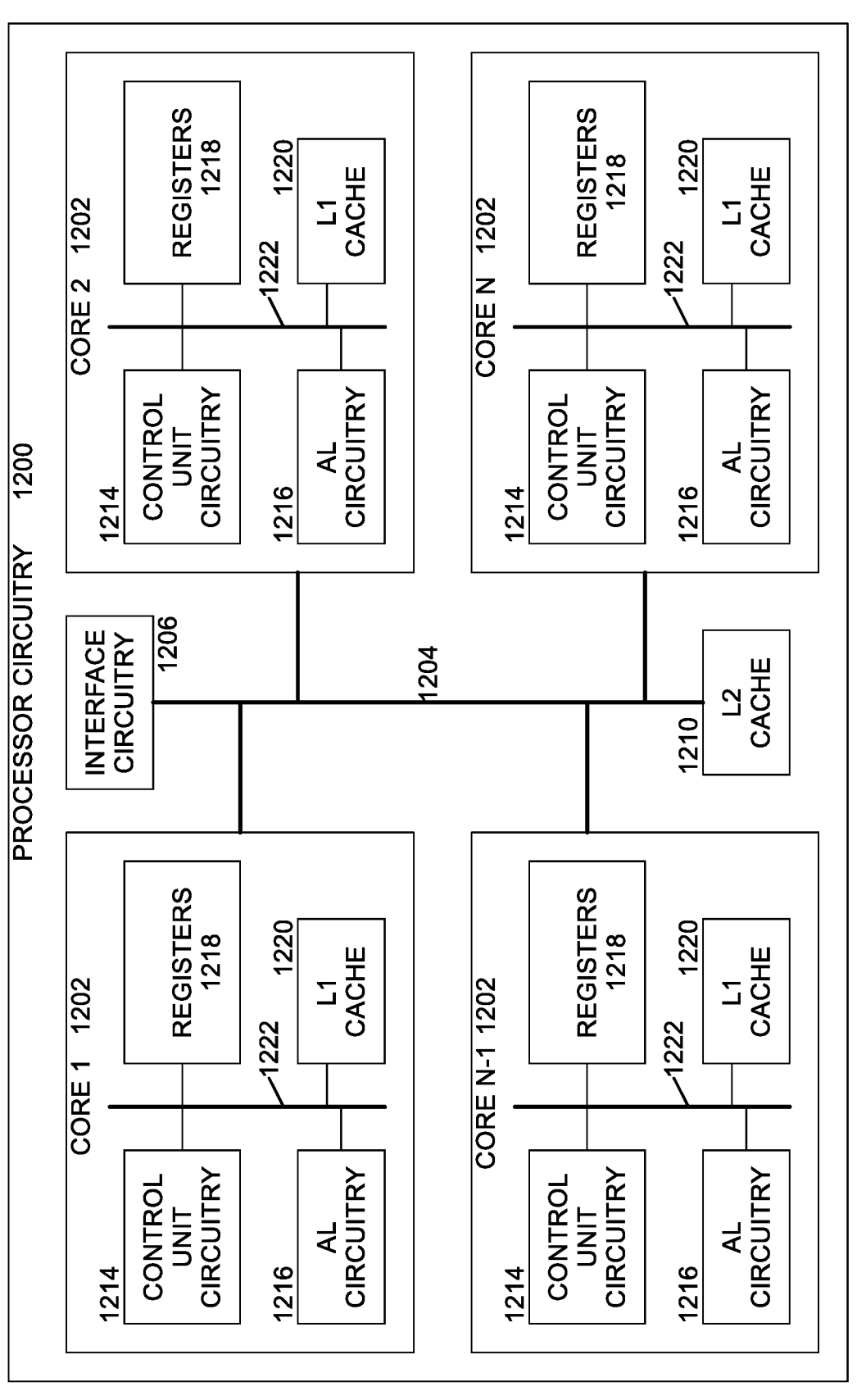
FIG. 8 is a block diagram of an example implementation of the processor circuitry of FIG. 7.

FIG. 8 is a block diagram of an example implementation of the processor circuitry 1112 of FIG. 7. In this example, the processor circuitry 1112 of FIG. 8 is implemented by a microprocessor 1200. For example, the microprocessor 1200 may implement multi-core hardware circuitry such as a CPU, a DSP, a GPU, an XPU, etc. Although it may include any number of example cores 1202 (e.g., 1 core), the microprocessor 1200 of this example is a multi-core semiconductor device including N cores. The cores 1202 of the microprocessor 1200 may operate independently or may cooperate to execute machine readable instructions. For example, machine code corresponding to a firmware program, an embedded software program, or a software program may be executed by one of the cores 1202 or may be executed by multiple ones of the cores 1202 at the same or different times. In some examples, the machine code corresponding to the firmware program, the embedded software program, or the software program is split into threads and executed in parallel by two or more of the cores 1202. The software program may correspond to a portion or all the machine-readable instructions and/or operations represented by the diagrams of FIGS. 1-6.

The cores 1202 may communicate by an example bus 1204. In some examples, the bus 1204 may implement a communication bus to effectuate communication associated with one(s) of the cores 1202. For example, the bus 1204 may implement at least one of an Inter-Integrated Circuit (I2C) bus, a Serial Peripheral Interface (SPI) bus, a PCI bus, or a PCIe bus. Additionally or alternatively, the bus 1204 may implement any other type of computing or electrical bus. The cores 1202 may obtain data, instructions, and/or signals from one or more external devices by example interface circuitry 1206. The cores 1202 may output data, instructions, and/or signals to the one or more external devices by the interface circuitry 1206. Although the cores 1202 of this example include example local memory 1220 (e.g., Level 1 (L1) cache that may be split into an L1 data cache and an L1 instruction cache), the microprocessor 1200 also includes example shared memory 1210 that may be shared by the cores (e.g., Level 2 (L2) cache)) for high-speed access to data and/or instructions. Data and/or instructions may be transferred (e.g., shared) by writing to and/or reading from the shared memory 1210. The local memory 1220 of each of the cores 1202 and the shared memory 1210 may be part of a hierarchy of storage devices including multiple levels of cache memory and the main memory (e.g., the main memory 1114, 1116 of FIG. 7). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1202 may be referred to as a CPU, DSP, GPU, etc., or any other type of hardware circuitry. Each core 1202 includes control unit circuitry 1214, arithmetic and logic (AL) circuitry (sometimes referred to as an ALU) 1216, a plurality of registers 1218, the L1 cache in local memory 1220, and an example bus 1222. Other structures may be present. For example, each core 1202 may include vector unit circuitry, single instruction multiple data (SIMD) unit circuitry, load/store unit (LSU) circuitry, branch/jump unit circuitry, floating-point unit (FPU) circuitry, etc. The control unit circuitry 1214 includes semiconductor-based circuits structured to control (e.g., coordinate) data movement within the corresponding core 1202. The AL circuitry 1216 includes semiconductor-based circuits structured to perform one or more mathematic and/or logic operations on the data within the corresponding core 1202. The AL circuitry 1216 of some examples performs integer-based operations. In other examples, the AL circuitry 1216 also performs floating point operations. In yet other examples, the AL circuitry 1216 may include first AL circuitry that performs integer-based operations and second AL circuitry that performs floating point operations. In some examples, the AL circuitry 1216 may be referred to as an Arithmetic Logic Unit (ALU). The registers 1218 are semiconductor-based structures to store data and/or instructions such as results of one or more of the operations performed by the AL circuitry 1216 of the corresponding core 1202. For example, the registers 1218 may include vector register(s), SIMD register(s), general purpose register(s), flag register(s), segment register(s), machine specific register(s), instruction pointer register(s), control register(s), debug register(s), memory management register(s), machine check register(s), etc. The registers 1218 may be arranged in a bank as shown in FIG. 8. Alternatively, the registers 1218 may be organized in any other arrangement, format, or structure including distributed throughout the core 1202 to shorten access time. The bus 1204 may implement at least one of an I2C bus, a SPI bus, a PCI bus, or a PCIe bus.

Each core 1202 and/or, more generally, the microprocessor 1200 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1200 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general-purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 9:
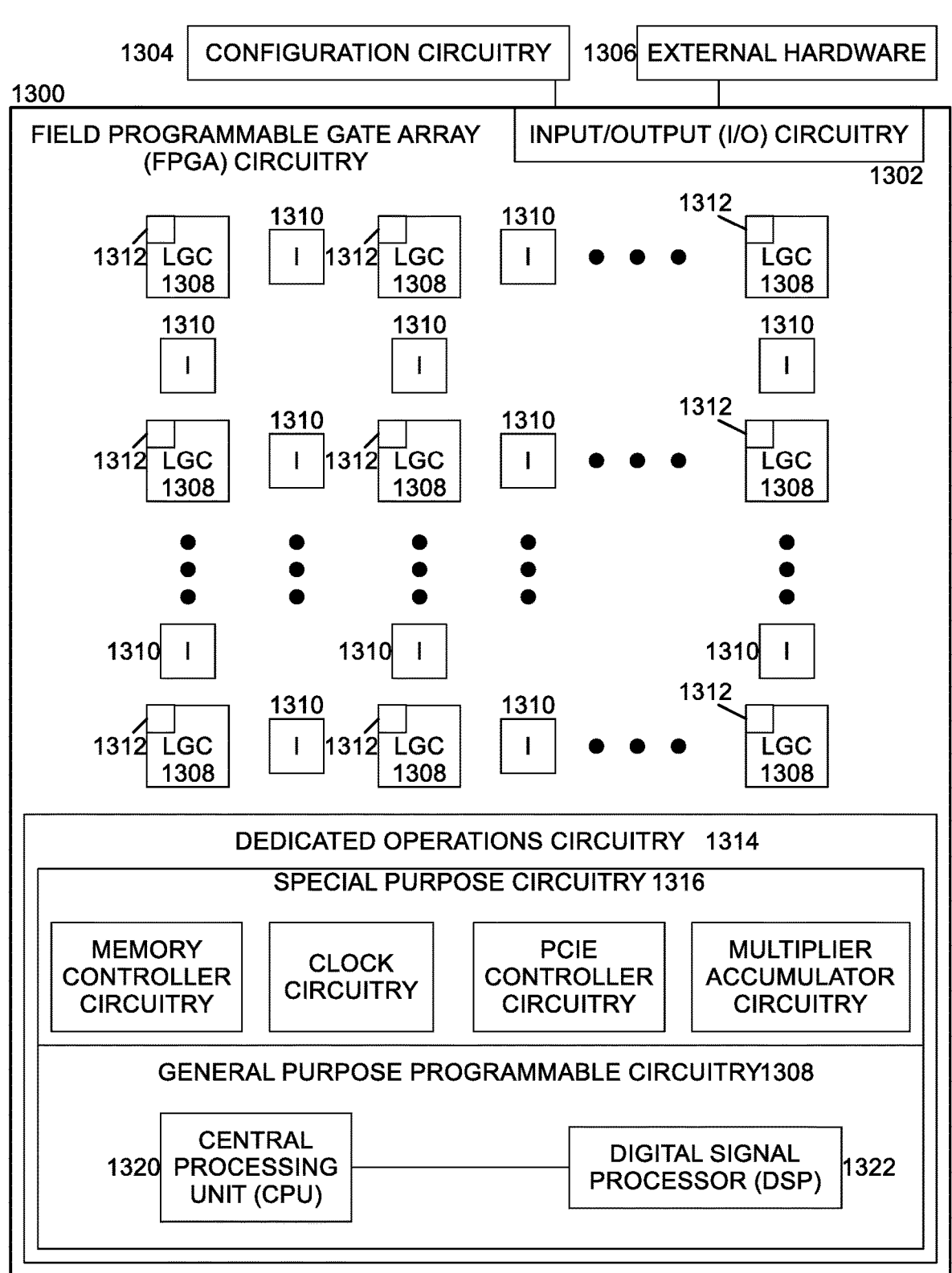
FIG. 9 is a block diagram of another example implementation of the processor circuitry of FIG. 7.

FIG. 9 is a block diagram of another example implementation of the processor circuitry 1112 of FIG. 7. In this example, the processor circuitry 1112 is implemented by FPGA circuitry 1300. The FPGA circuitry 1300 can be used, for example, to perform operations that could otherwise be performed by the example microprocessor 1200 of FIG. 8 executing corresponding machine-readable instructions. However, once configured, the FPGA circuitry 1300 instantiates the machine-readable instructions in hardware and, thus, can often execute the operations faster than they could be performed by a general-purpose microprocessor executing the corresponding software.

More specifically, in contrast to the microprocessor 1200 of FIG. 8 described above (which is a general purpose device that may be programmed to execute some or all of the machine readable instructions represented by the diagrams of FIGS. 1-6 but whose interconnections and logic circuitry are fixed once fabricated), the FPGA circuitry 1300 of the example of FIG. 9 includes interconnections and logic circuitry that may be configured and/or interconnected in different ways after fabrication to instantiate, for example, some or all of the machine readable instructions represented by the diagrams of FIGS. 1-6. In particular, the FPGA 1300 may be thought of as an array of logic gates, interconnections, and switches. The switches can be programmed to change how the logic gates are interconnected by the interconnections, effectively forming one or more dedicated logic circuits (unless and until the FPGA circuitry 1300 is reprogrammed). The configured logic circuits enable the logic gates to cooperate in different ways to perform different operations on data received by input circuitry. Those operations may correspond to some or all of the software represented by the diagrams of FIGS. 1-6. As such, the FPGA circuitry 1300 may be structured to effectively instantiate some or all the machine-readable instructions of the diagrams of FIGS. 1-6 as dedicated logic circuits to perform the operations corresponding to those software instructions in a dedicated manner analogous to an ASIC. Therefore, the FPGA circuitry 1300 may perform the operations corresponding to the some or all the machine-readable instructions of FIGS. 1-6 faster than the general-purpose microprocessor can execute the same.

In the example of FIG. 9, the FPGA circuitry 1300 is structured to be programmed (and/or reprogrammed one or more times) by an end user by a hardware description language (HDL) such as Verilog. The FPGA circuitry 1300 of FIG. 9, includes example input/output (I/O) circuitry 1302 to obtain and/or output data to/from example configuration circuitry 1304 and/or external hardware (e.g., external hardware circuitry) 1306. For example, the configuration circuitry 1304 may implement interface circuitry that may obtain machine readable instructions to configure the FPGA circuitry 1300, or portion(s) thereof. In some such examples, the configuration circuitry 1304 may obtain the machine-readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1306 may implement the microprocessor 1200 of FIG. 8. The FPGA circuitry 1300 also includes an array of example logic gate circuitry 1308, a plurality of example configurable interconnections 1310, and example storage circuitry 1312. The logic gate circuitry 1308 and interconnections 1310 are configurable to instantiate one or more operations that may correspond to at least some of the machine-readable instructions of FIGS. 1-6 and/or other desired operations. The logic gate circuitry 1308 shown in FIG. 9 is fabricated in groups or blocks. Each block includes semiconductor-based electrical structures that may be configured into logic circuits. In some examples, the electrical structures include logic gates (e.g., AND gates, OR gates, NOR gates, etc.) that provide basic building blocks for logic circuits. Electrically controllable switches (e.g., transistors) are present within each of the logic gate circuitry 1308 to enable configuration of the electrical structures and/or the logic gates to form circuits to perform desired operations. The logic gate circuitry 1308 may include other electrical structures such as look-up tables (LUTs), registers (e.g., flip-flops or latches), multiplexers, etc.

The interconnections 1310 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1308 to program desired logic circuits.

The storage circuitry 1312 of the illustrated example is structured to store result(s) of the one or more of the operations performed by corresponding logic gates. The storage circuitry 1312 may be implemented by registers or the like. In the illustrated example, the storage circuitry 1312 is distributed amongst the logic gate circuitry 1308 to facilitate access and increase execution speed.

The example FPGA circuitry 1300 of FIG. 9 also includes example Dedicated Operations Circuitry 1314. In this example, the Dedicated Operations Circuitry 1314 includes special purpose circuitry 1316 that may be invoked to implement commonly used functions to avoid the need to program those functions in the field. Examples of such special purpose circuitry 1316 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1300 may also include example general purpose programmable circuitry 1318 such as an example CPU 1320 and/or an example DSP 1322. Other general purpose programmable circuitry 1318 may additionally or alternatively be present such as a GPU, an XPU, etc., that can be programmed to perform other operations.

Although FIGS. 8 and 9 illustrate two example implementations of the processor circuitry 1112 of FIG. 7, many other approaches are contemplated. For example, as mentioned above, modern FPGA circuitry may include an on-board CPU, such as one or more of the example CPU 1320 of FIG. 9. Therefore, the processor circuitry 1112 of FIG. 7 may additionally be implemented by combining the example microprocessor 1200 of FIG. 8 and the example FPGA circuitry 1300 of FIG. 9. In some such hybrid examples, a first portion of the machine-readable instructions represented by the diagrams of FIGS. 1-6 may be executed by one or more of the cores 1202 of FIG. 8 and a second portion of the machine-readable instructions represented by the diagrams of FIGS. 1-6 may be executed by the FPGA circuitry 1300 of FIG. 9.

In some examples, the processor circuitry 1112 of FIG. 7 may be in one or more packages. For example, the processor circuitry 1200 of FIG. 8 and/or the FPGA circuitry 1300 of FIG. 9 may be in one or more packages. In some examples, an XPU may be implemented by the processor circuitry 1112 of FIG. 7, which may be in one or more packages. For example, the XPU may include a CPU in one package, a DSP in another package, a GPU in yet another package, and an FPGA in still yet another package.

Figure 10:
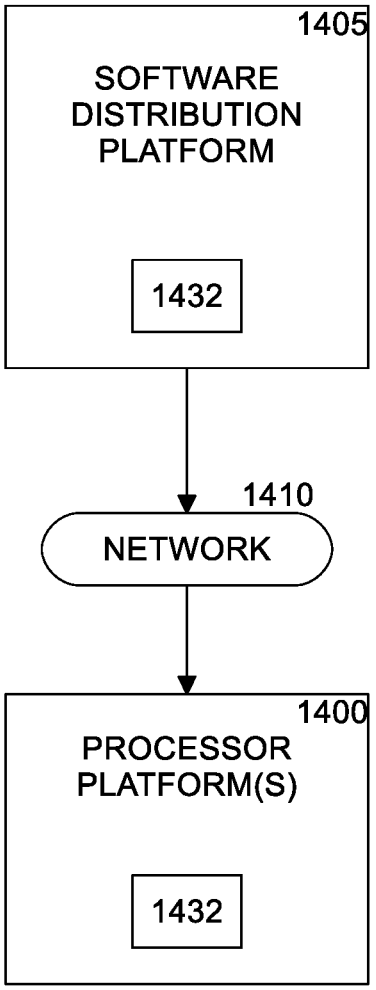
FIG. 10 is a block diagram illustrating an example software distribution platform to distribute software such as the example machine readable instructions of FIG. 7 to hardware devices owned and/or operated by third parties.

A block diagram illustrating an example software distribution platform 1405 to distribute software such as the example machine readable instructions 1132 of FIG. 7 to hardware devices owned and/or operated by third parties is illustrated in FIG. 10. The example software distribution platform 1405 may be implemented by any computer server, data facility, cloud service, etc., capable of storing and transmitting software to other computing devices. The third parties may be customers of the entity owning and/or operating the software distribution platform 1405. For example, the entity that owns and/or operates the software distribution platform 1405 may be a developer, a seller, and/or a licensor of software such as the example machine readable instructions 1132 of FIG. 7. The third parties may be consumers, users, retailers, OEMs, etc., who purchase and/or license the software for use and/or re-sale and/or sub-licensing. In the illustrated example, the software distribution platform 1405 includes one or more servers and one or more storage devices. The storage devices store the machine-readable instructions 1132, which may correspond to the example machine readable instructions, as described above. The one or more servers of the example software distribution platform 1405 are in communication with a network 1410, which may correspond to any one or more of the Internet and/or any of the example networks, etc., described above. In some examples, the one or more servers are responsive to requests to transmit the software to a requesting party as part of a commercial transaction. Payment for the delivery, sale, and/or license of the software may be handled by the one or more servers of the software distribution platform and/or by a third-party payment entity. The servers enable purchasers and/or licensors to download the machine-readable instructions 1132 from the software distribution platform 1405. For example, the software, which may correspond to the example machine readable instructions described above, may be downloaded to the example processor platform 1400, which is to execute the machine-readable instructions 1132 to implement the methods described above and associated computing system(s). In some examples, one or more servers of the software distribution platform 1405 periodically offer, transmit, and/or force updates to the software (e.g., the example machine readable instructions 1132 of FIG. 7) to ensure improvements, patches, updates, etc., are distributed and applied to the software at the end user devices.

In some examples, an apparatus includes means for data processing of FIGS. 1-6. For example, the means for processing may be implemented by processor circuitry, processor circuitry, firmware circuitry, other circuitry, etc. In some examples, the processor circuitry may be implemented by machine executable instructions executed by processor circuitry, which may be implemented by the example processor circuitry 1112 of FIG. 7, the example processor circuitry 1200 of FIG. 8, and/or the example Field Programmable Gate Array (FPGA) circuitry 1300 of FIG. 9. In other examples, the processor circuitry is implemented by other hardware logic circuitry, hardware implemented state machines, and/or any other combination of hardware, software, and/or firmware. For example, the processor circuitry may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

From the foregoing, it will be appreciated that example systems, methods, apparatus, and articles of manufacture have been disclosed that provide trusted security islands in a computing system. The disclosed systems, methods, apparatus, and articles of manufacture improve the security a computing device. The disclosed systems, methods, apparatus, and articles of manufacture are accordingly directed to one or more improvement(s) in the operation of a machine such as a computer or other electronic and/or mechanical device.

The following examples pertain to further embodiments. Specifics in the examples may be used anywhere in one or more embodiments. Example 1 is a system including a memory to store a plurality of security quality of service (QoS) profiles and configuration attributes of a first computing system; and a processor to determine a security QoS profile matching the configuration attributes; generate an interdependency flow graph based at least in part on the security QoS profile and the configuration attributes; generate a recommended configuration for the first computing system from the interdependency flow graph; and send the recommended configuration to a second computing system.

In Example 2, the subject matter of Example 1 may optionally include may optionally include the processor to generate feedback from machine learning on real-time telemetry data of the first computing system and adjust the recommended configuration of the first computing system based at least in part on the feedback. In Example 3, the subject matter of Example 2 may optionally include the processor to store the plurality of security QoS profiles, configuration attributes, interdependency flow graph, real-time telemetry data and feedback in a secure database providing a secure audit trail. In Example 4, the subject matter of Example 1 may optionally include wherein the security QoS profile comprises a set of security QoS requirements of a plurality of components of the first computing system, the plurality of components including one or more of a central processing unit (CPU), a graphics processing unit (GPU), an application specific integrated circuit (ASIC), and a field programmable gate array (FPGA). In Example 5, the subject matter of Example 4 may optionally include wherein the set of security QoS requirements comprises a processor version and security characteristics of the processor version of at least one of the plurality of components of the first computing system. In Example 6, the subject matter of Example 1 may optionally include the processor to configure the first computing system based at least in part on the recommended configuration. In Example 7, the subject matter of Example 1 may optionally include wherein configuration attributes comprise number, type, and attributes of hardware components and software components of the first computing system. In Example 8, the subject matter of Example 1 may optionally include the processor to determine a security QoS profile matching the configuration attributes by identifying a security QoS profile that meets service level agreement (SLA) requirements of an application to be run on the first computing system. In Example 9, the subject matter of Example 1 may optionally include the processor to perform remote attestation of components of the first computing system exposed by the configuration attributes.

In Example 10, the subject matter of Example 1 may optionally include the processor to generate an interdependency flow graph as a function of one or more of an interaction matrix, QoS attributes, application service level objectives (SLO), and feedback from machine learning on real-time telemetry data of the first computing system. In Example 11, the subject matter of Example 1 may optionally include the processor to regenerate the interdependency flow graph and the recommend configuration in response to a hardware component of the first computing system is added to the first computing system or removed from the first computing system during runtime.

Example 12 is a method including determining a security quality of service (QoS) profile matching configuration attributes of a first computing system; generating an interdependency flow graph based at least in part on the security QoS profile and the configuration attributes; generating a recommended configuration for the first computing system from the interdependency flow graph; and sending the recommended configuration to a second computing system. In Example 13, the subject matter of Example 12 may optionally include generating feedback from machine learning on real-time telemetry data of the first computing system and adjusting the recommended configuration of the first computing system based at least in part on the feedback. In Example 14, the subject matter of Example 13 may optionally include storing the security QoS profile, configuration attributes, interdependency flow graph, real-time telemetry data and feedback in a secure database providing a secure audit trail. In Example 15, the subject matter of Example 12 may optionally include wherein the security QoS profile comprises a set of security QoS requirements of a plurality of components of the first computing system, the plurality of components including one or more of a central processing unit (CPU), a graphics processing unit (GPU), an application specific integrated circuit (ASIC), and a field programmable gate array (FPGA). In Example 16, the subject matter of Example 15 may optionally include wherein the set of security QoS requirements comprises a processor version and security characteristics of the processor version of at least one of the plurality of components of the first computing system. In Example 17, the subject matter of Example 12 may optionally include configuring the first computing system based at least in part on the recommended configuration.

Example 18 is at least one machine-readable storage medium comprising instructions which, when executed by at least one processor, cause the at least one processor to determine a security quality of service (QoS) profile matching configuration attributes of a first computing system; generate an interdependency flow graph based at least in part on the security QoS profile and the configuration attributes; generate a recommended configuration for the first computing system from the interdependency flow graph; and send the recommended configuration to a second computing system.

In Example 19, the subject matter of Example 18 may optionally include instructions which, when executed by the at least one processor, cause the at least one processor to generate feedback from machine learning on real-time telemetry data of the first computing system and adjust the recommended configuration of the first computing system based at least in part on the feedback. In Example 20, the subject matter of Example 19 may optionally include instructions which, when executed by the at least one processor, cause the at least one processor to store the security QoS profile, configuration attributes, interdependency flow graph, real-time telemetry data and feedback in a secure database providing a secure audit trail. In Example 21, the subject matter of Example 18 may optionally include wherein the security QoS profile comprises a set of security QoS requirements of a plurality of components of the first computing system, the plurality of components including one or more of a central processing unit (CPU), a graphics processing unit (GPU), an application specific integrated circuit (ASIC), and a field programmable gate array (FPGA). In Example 22, the subject matter of Example 21 may optionally include wherein the set of security QoS requirements comprises a processor version and security characteristics of the processor version of at least one of the plurality of components of the first computing system.

Example 23 is an apparatus operative to perform the method of any one of Examples 12 to 17. Example 24 is an apparatus that includes means for performing the method of any one of Examples 12 to 17. Example 25 is an apparatus that includes any combination of modules and/or units and/or logic and/or circuitry and/or means operative to perform the method of any one of Examples 12 to 17. Example 26 is an optionally non-transitory and/or tangible machine-readable medium, which optionally stores or otherwise provides instructions that if and/or when executed by a computer system or other machine are operative to cause the machine to perform the method of any one of Examples 12 to 17.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the examples of this patent.

What is claimed is:

1. A first computing system comprising:
a memory to store a plurality of security quality of service (QoS) profiles and configuration attributes of the first computing system;
a plurality of components having respective performance monitoring units to provide real-time telemetry data about the respective components; and
a processor to:
determine a security QoS profile matching the configuration attributes;
generate an interdependency flow graph based at least in part on the security QoS profile and the configuration attributes;
generate a recommended configuration for the first computing system based on the interdependency flow graph and the real-time telemetry data;
send the recommended configuration to a second computing system; and
configure the first computing system based at least in part on the recommended configuration.

2. The system of claim 1, comprising the processor to generate feedback from machine learning on real-time telemetry data of the first computing system and generate the recommended configuration for the first computing system based at least in part on the feedback.

3. The system of claim 2, comprising the processor to store the plurality of security QoS profiles, configuration attributes, interdependency flow graph, real-time telemetry data and feedback in a secure database providing a secure audit trail.

4. The system of claim 1, wherein the security QoS profile comprises a set of security QoS requirements of the plurality of components of the first computing system, the plurality of components including a central processing unit (CPU), a graphics processing unit (GPU), an application specific integrated circuit (ASIC), or a field programmable gate array (FPGA).

5. The system of claim 4, wherein the set of security QoS requirements comprises a processor version and security characteristics of the processor version of at least one of the plurality of components of the first computing system.

6. The system of claim 1, wherein configuration attributes comprise a number, a type, and attributes of the plurality of components and software components of the first computing system.

7. The system of claim 1, comprising the processor to determine a security QoS profile matching the configuration attributes by identifying a security QoS profile that meets service level agreement (SLA) requirements of an application to be run on the first computing system.

8. The system of claim 1, comprising the processor to perform remote attestation of components of the first computing system exposed by the configuration attributes.

9. The system of claim 1, comprising the processor to generate the interdependency flow graph as a function of an interaction matrix, QoS attributes, application service level objectives (SLO), or feedback from machine learning on the real-time telemetry data of the first computing system.

10. The system of claim 1, comprising the processor to regenerate the interdependency flow graph and the recommended configuration in response to a hardware component of the plurality of components of the first computing system being added to the first computing system or removed from the first computing system during runtime.

11. A method comprising:
determining a security quality of service (QoS) profile matching configuration attributes of a first computing system;
generating an interdependency flow graph based at least in part on the security QoS profile and the configuration attributes;
generating a recommended configuration for the first computing system based on the interdependency flow graph and real-time telemetry data from a plurality of components of the first computing system;
sending the recommended configuration to a second computing system; and
configuring the first computing system based at least in part on the recommended configuration.

12. The method of claim 11, comprising generating feedback from machine learning on the real-time telemetry data of the first computing system and generating the recommended configuration of the first computing system based at least in part on the feedback.

13. The method of claim 12, comprising storing the security QoS profile, configuration attributes, interdependency flow graph, the real-time telemetry data and feedback in a secure database providing a secure audit trail.

14. The method of claim 11, wherein the security QoS profile comprises a set of security QoS requirements of the plurality of components of the first computing system, the plurality of components including a central processing unit (CPU), a graphics processing unit (GPU), an application specific integrated circuit (ASIC), or a field programmable gate array (FPGA).

15. The method of claim 14, wherein the set of security QoS requirements comprises a processor version and security characteristics of the processor version of at least one of the plurality of components of the first computing system.

16. At least one non-transitory machine-readable storage medium comprising instructions which, when executed by at least one processor, cause the at least one processor to:

determine a security quality of service (QoS) profile matching configuration attributes of a first computing system;

generate an interdependency flow graph based at least in part on the security QoS profile and the configuration attributes;

generate a recommended configuration for the first computing system from the interdependency flow graph and real-time telemetry data from a plurality of components of the first computing system;

send the recommended configuration to a second computing system; and configure the first computing system based at least in part on the recommended configuration.

17. The at least one non-transitory machine-readable storage medium of claim 16, comprising instructions which, when executed by the at least one processor, cause the at least one processor to generate feedback from machine learning on the real-time telemetry data of the first computing system and generate the recommended configuration of the first computing system based at least in part on the feedback.

18. The at least one non-transitory machine-readable storage medium of claim 17, comprising instructions which, when executed by the at least one processor, cause the at least one processor to store the security QoS profile, configuration attributes, interdependency flow graph, the real-time telemetry data and feedback in a secure database providing a secure audit trail.

19. The at least one non-transitory machine-readable storage medium of claim 16, wherein the security QoS profile comprises a set of security QoS requirements of the plurality of components of the first computing system, the plurality of components including a central processing unit (CPU), a graphics processing unit (GPU), an application specific integrated circuit (ASIC), or a field programmable gate array (FPGA).

20. The at least one non-transitory machine-readable storage medium of claim 19, wherein the set of security QoS requirements comprises a processor version and security characteristics of the processor version of at least one of the plurality of components of the first computing system.

* * * * *